United States Patent
Wang et al.

(10) Patent No.: US 11,342,882 B2
(45) Date of Patent: May 24, 2022

(54) TEMPERATURE CONTROL FOR ENERGY STORAGE SYSTEM

(71) Applicant: General Electric Company, Schenectady, NY (US)

(72) Inventors: Honggang Wang, Clifton Park, NY (US); Ralph Teichmann, Niskayuna, NY (US); Keith Garrette Brown, Clifton Park, NY (US); Alistair Martin Waddell, Bavaria (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/755,791

(22) PCT Filed: Oct. 12, 2018

(86) PCT No.: PCT/US2018/055560
§ 371 (c)(1),
(2) Date: Apr. 13, 2020

(87) PCT Pub. No.: WO2019/075294
PCT Pub. Date: Apr. 18, 2019

(65) Prior Publication Data
US 2021/0194076 A1   Jun. 24, 2021

Related U.S. Application Data

(60) Provisional application No. 62/587,015, filed on Nov. 16, 2017, provisional application No. 62/576,880, (Continued)

(51) Int. Cl.
*H02S 40/42* (2014.01)
*H02S 30/10* (2014.01)
(Continued)

(52) U.S. Cl.
CPC ............ *H02S 40/42* (2014.12); *B65D 88/121* (2013.01); *B65D 88/74* (2013.01); *H01M 10/482* (2013.01);
(Continued)

(58) Field of Classification Search
CPC .................................................. H01M 10/613
See application file for complete search history.

(56) References Cited

U.S. PATENT DOCUMENTS

| 7,045,236 B1 * | 5/2006 | Andrew | H01M 10/613 429/83 |
| 2006/0196954 A1 * | 9/2006 | Okuda | H01M 10/615 236/49.3 |

(Continued)

FOREIGN PATENT DOCUMENTS

| EP | 2797158 A1 * | 10/2014 | .......... H01M 10/482 |
| KR | 20150067842 A | 6/2015 | |

(Continued)

OTHER PUBLICATIONS

Xie et al., "Adaptive Thermal Management for Portable System Batteries by Forced Convection Cooling", Design, Automation & Test in Europe Conference & Exhibition (DATE), http://ieeexplore.ieee.org/document/6513700/, Mar. 18-22, 2013.

(Continued)

*Primary Examiner* — Brian R Ohara
(74) *Attorney, Agent, or Firm* — Armstrong Teasdale LLP

(57) ABSTRACT

An energy storage system includes a plurality of battery strings, each battery string including a plurality of batteries coupled electrically together; a plurality of temperature sensors; an enclosure housing the plurality of battery strings and the temperature sensors; a plurality of fans positioned in different locations within the enclosure; and a temperature control system. The temperature control system includes a (Continued)

heating, ventilation, and air conditioning (HVAC) components, and a controller. The controller is programmed to execute the method that includes determining fan speed operating commands based at least in part on sensed temperatures at the different locations, and operating the fan speed in response to the operating commands provided to the respective fans.

12 Claims, 8 Drawing Sheets

Related U.S. Application Data filed on Oct. 25, 2017, provisional application No. 62/571,324, filed on Oct. 12, 2017.

(51) Int. Cl.

| | | |
|---|---|---|
| *H02S 40/38* | (2014.01) |
| *B65D 88/12* | (2006.01) |
| *B65D 88/74* | (2006.01) |
| *H01M 10/613* | (2014.01) |
| *H01M 10/63* | (2014.01) |
| *H01M 10/6563* | (2014.01) |
| *H01M 10/48* | (2006.01) |

(52) U.S. Cl.
CPC ....... *H01M 10/486* (2013.01); *H01M 10/613* (2015.04); *H01M 10/63* (2015.04); *H01M 10/6563* (2015.04); *H02S 30/10* (2014.12); *H02S 40/38* (2014.12)

(56) References Cited

U.S. PATENT DOCUMENTS

| | | |
|---|---|---|
| 2008/0213652 A1 | 9/2008 | Scheucher |
| 2011/0228471 A1 | 9/2011 | Humphrey et al. |
| 2013/0166119 A1 | 6/2013 | Kummer et al. |
| 2013/0175022 A1 | 7/2013 | King et al. |
| 2013/0269911 A1 | 10/2013 | Carpenter et al. |
| 2013/0298583 A1 | 11/2013 | O'Donnell et al. |
| 2014/0038007 A1 | 2/2014 | Ahn |
| 2016/0107503 A1 | 4/2016 | Johnston |
| 2016/0181835 A1 | 6/2016 | Gross et al. |
| 2017/0062885 A1 | 3/2017 | Cutright et al. |
| 2017/0248338 A1 | 8/2017 | Ray |
| 2017/0366023 A1* | 12/2017 | Tanaka ................ H01M 10/443 |

FOREIGN PATENT DOCUMENTS

| | | |
|---|---|---|
| KR | 20170010621 A | 2/2017 |
| WO | 2016132586 A1 | 8/2016 |

OTHER PUBLICATIONS

El-Ladan et al., "Fan-Pad Evaporative Battery Cooling For Hybrid Electric Vehicle Thermal Management", IET International Conference on Resilience of Transmission and Distribution Networks (RTDN), http://ieeexplore.ieee.org/document/7447264/, Sep. 22-24, 2015.

International Search Report and Written Opinion, dated Dec. 2, 2019, for related International application No. PCT/US2018/055560.

* cited by examiner

TEMPERATURE CONTROL FOR ENERGY STORAGE SYSTEM

CROSS-REFERENCE TO RELATED APPLICATIONS

This application is a National Stage Entry of PCT/US2018/055560, filed on Oct. 12, 2018, which claims the benefit of U.S. Provisional Patent Application No. 62/576,880, filed on Oct. 25, 2017; U.S. Provisional Patent Application No. 62/587,015, filed on Nov. 16, 2017; and U.S. Provisional Patent Application No. 62/571,324, filed on Oct. 12, 2017, which are all incorporated herein by reference. The subject matter disclosed herein relates generally to temperature control of energy storage systems.

BACKGROUND

The worldwide demand for electrical energy has been increasing year by year. Much of the electrical energy demand is met by energy produced from conventional energy sources such as coal and gas. However, in recent years, there has been a push for electricity generation by renewable energy resources such as solar power and wind power.

Wind turbine generators are regarded as environmentally friendly and relatively inexpensive alternative sources of energy that utilize wind energy to produce electrical power. Further, solar power generation uses photovoltaic (PV) modules to generate electricity from the sunlight. Since the intensity of wind and sunlight is not constant, the power output of wind turbines and PV modules fluctuate throughout the day. Unfortunately, the electricity demand does not vary in accordance with solar and wind variations.

An energy storage system may help to address the issue of variability of solar and wind power to some extent. Essentially, the variable power from solar and wind power plants can be stored in the energy storage system which can then be used at a later time or at a remote location.

Energy storage systems may also be charged from a power network and could be used to address frequency variations, harmonic suppression, voltage support, and power quality in the power network.

Energy storage systems experience and generate heat. In particular, the greatest amount of heat is generated during charging and discharging of the batteries. If the heat is not removed, the heat accumulates in the battery container and battery life is reduced. Heating, ventilation, and air conditioning (HVAC) systems may be used to control temperatures of energy storage systems. Usually at least one HVAC system is equipped within an enclosed energy storage system for thermal management of multiple racks of energy storage modules distributed spatially in the enclosure. However, there may be significant temperature imbalance among the different racks due to conditions and air flow dead zones in the enclosure. In embodiments wherein the energy storage modules include lithium ion batteries, for example, such batteries normally work optimally at 20 degrees Celsius to 25 degrees Celsius, and operating at too high or too low temperatures shortens the life and leads to capacity loss.

It would be desirable to have improved temperature control of energy storage systems.

BRIEF DESCRIPTION

An energy storage system includes a plurality of battery strings, each battery string including a plurality of batteries coupled electrically together; a plurality of temperature sensors; an enclosure housing the plurality of battery strings and the temperature sensors; a plurality of fans positioned in different locations within the enclosure; and a temperature control system, which includes a heating, ventilation, and air conditioning (HVAC) components, and a controller programmed to execute the method that includes determining fan speed operating commands based at least in part on sensed temperatures at the different locations, and operating the respective fans in response to the fan speed operating commands provided to the respective fans.

A method for controlling the temperature of an energy storage system disposed within an enclosure having a plurality of DC/DC power converters; the method including sensing temperatures at respective DC/DC power converters having at least one fan approximate the respective power converters; determining fan speed operating commands based at least in part on the sensed temperatures at the respective DC/DC power converters; and operating the respective fans in response to the fan speed operating commands provided to the respective fans.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
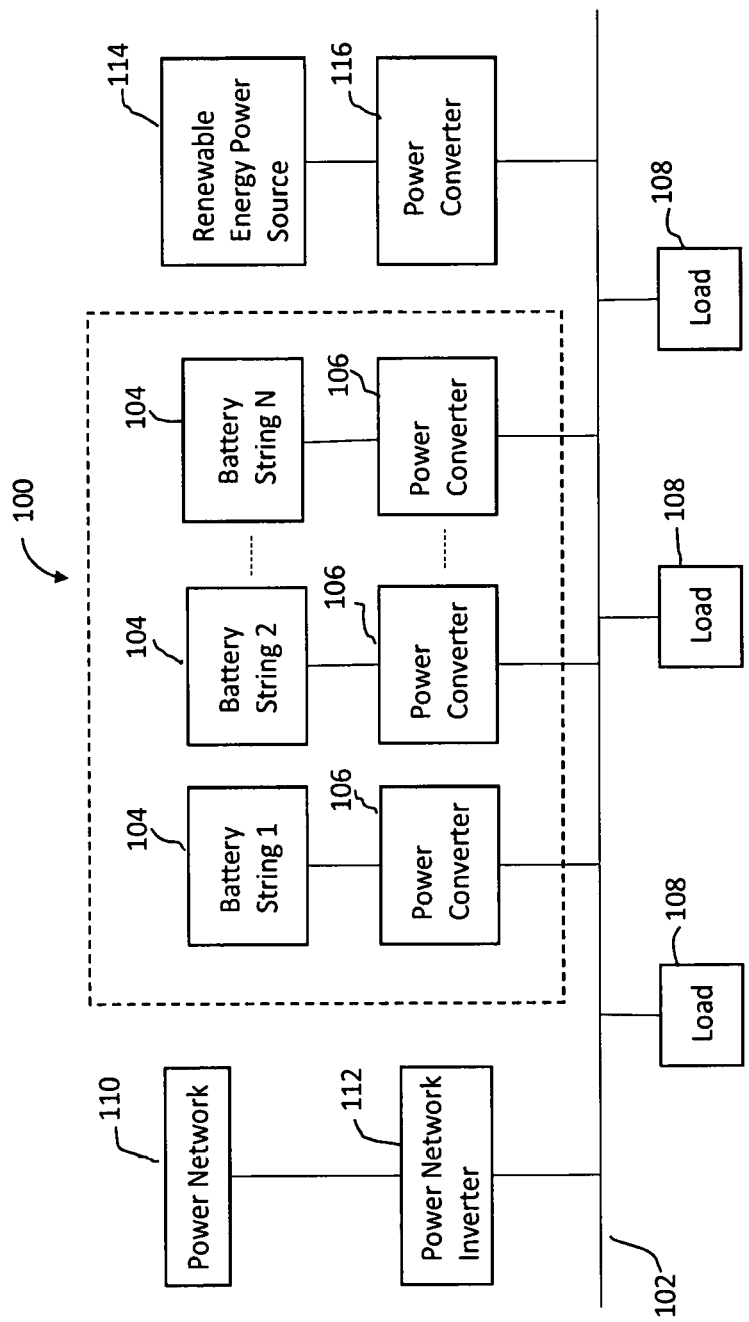
FIG. 1 is a block diagram of an energy storage system coupled to a renewable power generation system and power network in accordance with the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The term "1-n" and the like refers to a plurality of components or devices which may include one component or device to "n" number of components or devices.

Figure 3:
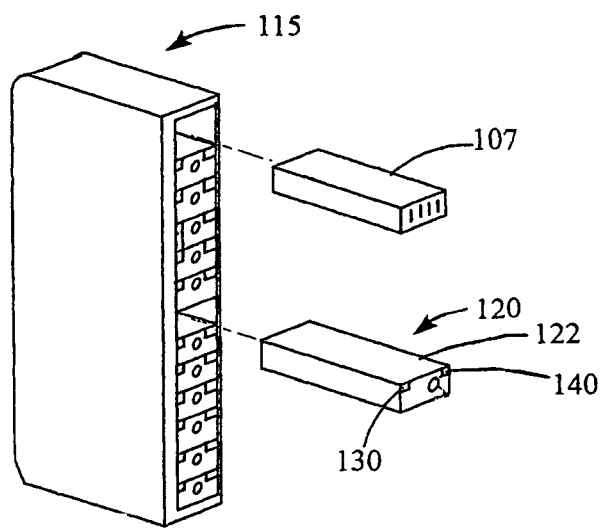
FIG. 3 is a schematic view of a battery module string having a plurality of vertically stacked energy storage modules in accordance with the present invention.

FIG. 1 illustrates a DC-coupled energy storage system 100 coupled to a renewable energy power source 114. The energy storage system 100 includes a DC bus 102. A plurality of batteries strings 104 is connected to the DC bus 102 through a respective plurality of power converters 106. Each of the battery strings 104 include a plurality of batteries 120, such as an energy storage module, as shown in FIG. 3, connected in series and/or parallel. The batteries 120 in each battery string 104 may get charged from the DC bus, and/or may provide energy to one or more loads 108 connected to the DC bus. The power converters 106, which may be a DC-to-DC (dc/dc) converter, may charge the battery strings 104 from a power grid/network 110, or a renewable energy power source 114, such as a solar power module. Further, the power converter 106 connected to a battery string 104 can facilitate transfer of energy from one battery string 104 to another battery string 104 and/or from one battery 120 to another battery within one battery string 104. The one or more of plurality of power converters 106 may include a buck converter, a boost converter, a buck-boost converter, a flyback converter or any other suitable dc/dc power converter. Loads 108 can include a car charger, electric drives, lighting loads etc. When a particular load is an alternating current (AC) load a DC-to-AC converter may be used between the DC bus 102 and the AC load(s).

In some implementations, the DC bus 102 of energy storage system 100 may be connected to AC power network or grid 110 via a power network inverter 112. The power network or grid 110 can be a consumer, commercial, and/or utility scale power grid. In some implementations the energy storage system 100 may also be connected to renewable energy power source 114, which can generate energy from one or more renewable energy generation sources (e.g., photovoltaic (PV) panels, wind turbines, geothermal exchanges, or any other renewable energy generation source). The renewable energy power source 114 is connected to the energy storage system via a power converter 116.

In an embodiment where the renewable power module 114 includes PV panels, the renewable power converter 116 may be a PV converter. By controlling the DC bus voltage, batteries 120 in the battery strings 104 may be charged from the power network 110 and/or the renewable power module 114. Moreover, in some embodiments, the battery strings 104 may supply power to the power network 110.

Figure 2:
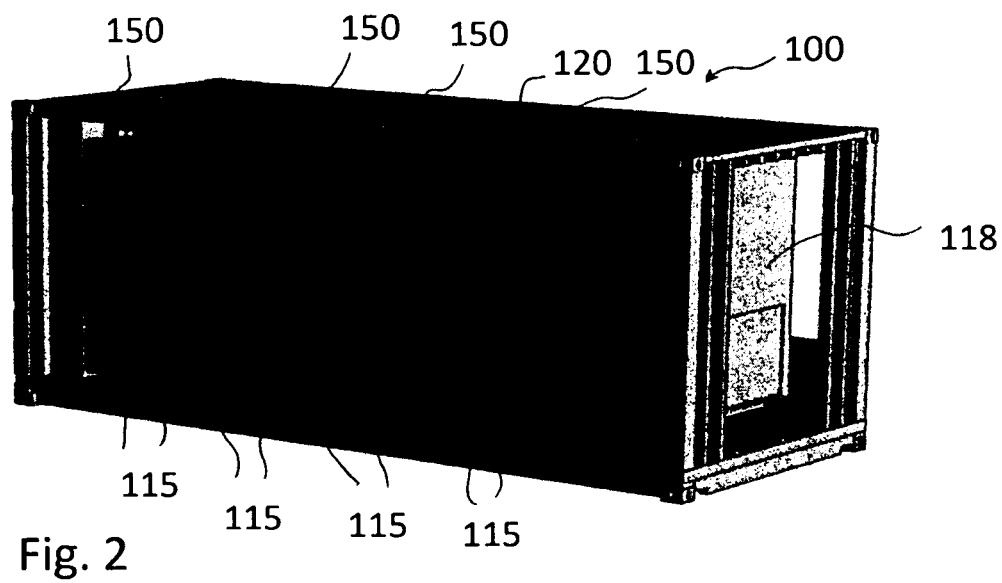
FIG. 2 is a perspective view of an energy storage container including a plurality of battery module strings in accordance with the present invention.

FIG. 2 illustrates an energy storage system 100 according to some embodiments. In the illustrated embodiment, the energy storage system 100 includes a container or enclosure 102 and a plurality of battery module strings 115 installed therein. The battery module strings 115 may be coupled together electrically, as well as physically in some embodiments. In the illustrated embodiment, the energy storage modules 120 are stacked vertically such that the height dimension of the battery module string 115 is significantly greater than the depth dimension. Although the illustrated embodiment of FIG. 2 shows the battery module string 115 including a single energy storage module 120 per row, the battery module string may further include two or more energy storage modules per row where each energy storage module may be separately controllable.

As shown in FIG. 2, the container 102 may further include power electronics and/or temperature control equipment 118, such as a heating, ventilation and air conditioning (HVAC) system, to manage operation and cooling of the battery module string 115. In one embodiment, the container 102 may be an intermodal shipping container available. The container 102 may include a single, open volume or it may contain separate compartments which may be used to store the battery module strings 115 separate from other electronics and temperature control equipment 118. As will be described in further detail herein, container 102 may further include a high voltage DC bus 102 to which the multiple battery module strings 115 may be electrically coupled in parallel and/or in series.

FIG. 3 illustrates a partially exploded view of a battery module string 115, according to some embodiments. Each battery module string 115 includes a plurality of energy storage modules 120 electrically coupled in series and/or in parallel combinations to form a battery string 104, similar to that shown in FIG. 1. The battery module strings 115 may further include the power converter 106, similar to that shown in FIG. 1, to regulate voltage between a high voltage DC bus (e.g., shown in FIG. 1) and the energy storage modules 120. The energy storage modules 120 may each include a module housing 122, a positive polarity module terminal 130 and a negative polarity module terminal 140.

Figure 5:
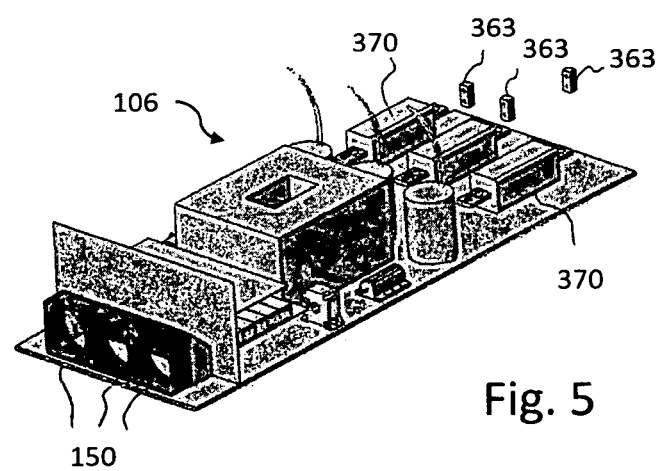
FIG. 5 is a perspective schematic view of a dc/dc power converter of a battery module string in accordance with the present invention.

As best shown in FIGS. 2 and 5, the power converter 106 may include at least one or more fans 150 disposed therein or in thermal communication with the power converter to control the temperature of the battery module strings 115. In one embodiment, the power converter 106 may further include a controller such as a processor configured to store and process instructions, which wholly or partly control the respective battery module string 115.

In another embodiment, wherein the battery strings 104 comprise vertically stacked battery sub modules 120, the fans 150 are situated above respective ones of the battery strings and need not direct air across converters before the air is provided to the battery strings. Although the fans 150 are shown in series with the main cooling system (HVAC) in the embodiment of FIG. 2, in other embodiments, the HVAC system 118 and the fans 150 may be in a parallel arrangement or a combination of a parallel and a series arrangement. In yet another embodiment, either individual fans or groups of fans 150 are situated relative to multiple respective battery strings 104 and direct air across multiple battery strings. Such embodiments may be useful to reduce air ducting (and associated installation cost).

Figure 4:
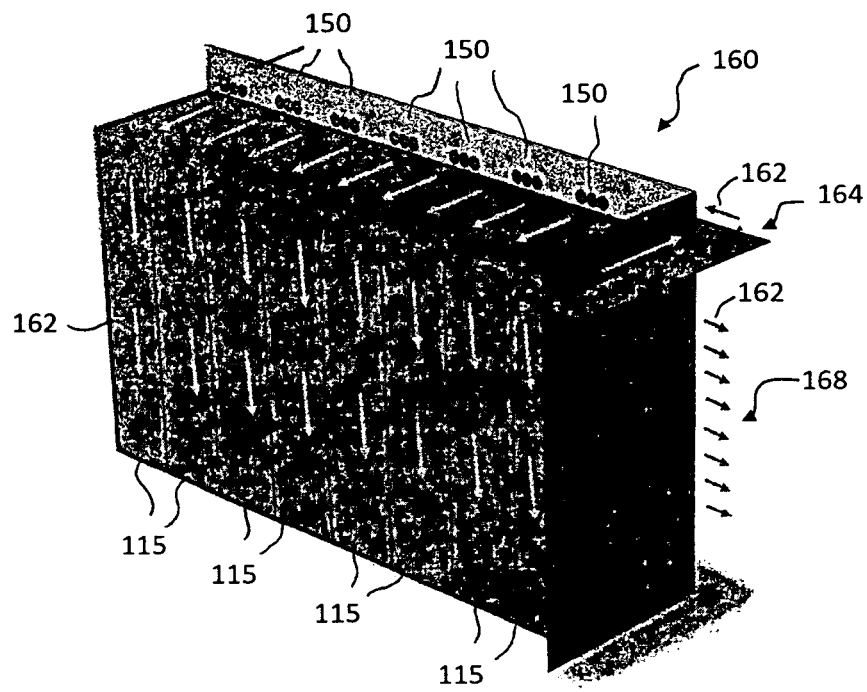
FIG. 4 is a schematic view of an air ducting arrangement of an energy storage container in accordance with the present invention.

FIG. 4 is a schematic view of an air ducting arrangement 160 within the container 102 of the energy storage system 100 in accordance with an embodiment disclosed herein. In the exemplary embodiment of FIG. 4, as can be seen from the direction of air flow arrows 162, air provided by the HVAC system 118, as shown in FIG. 2, enters and passes through an upper duct 164 to a plurality of fans 150. The fans 150 pass the air across the power converters 106 of each battery module string 115 before being directed downward across each respective battery module string 115 and then to a lower rear duct 168 back to the HVAC system 118. The fans 150 may be disposed adjacent to or within respective power converter 106. FIG. 4 illustrates a layout wherein the vertically stacked battery sub modules and the fans are situated above respective ones of the battery strings. In another embodiment, the battery strings comprise horizontally stacked battery sub modules and the fans are situated on one or more sides of respective ones of the battery strings.

As shown in FIG. 5, a plurality of fans is shown disposed at one end of a representative power converter 106. While three fans 150 are shown, one will appreciate the number of fans may include one or more fans. The operation of the fans 150 circulates air across the power converter to the plurality of energy storage modules 120 of the corresponding battery module strings 115.

Figure 6:
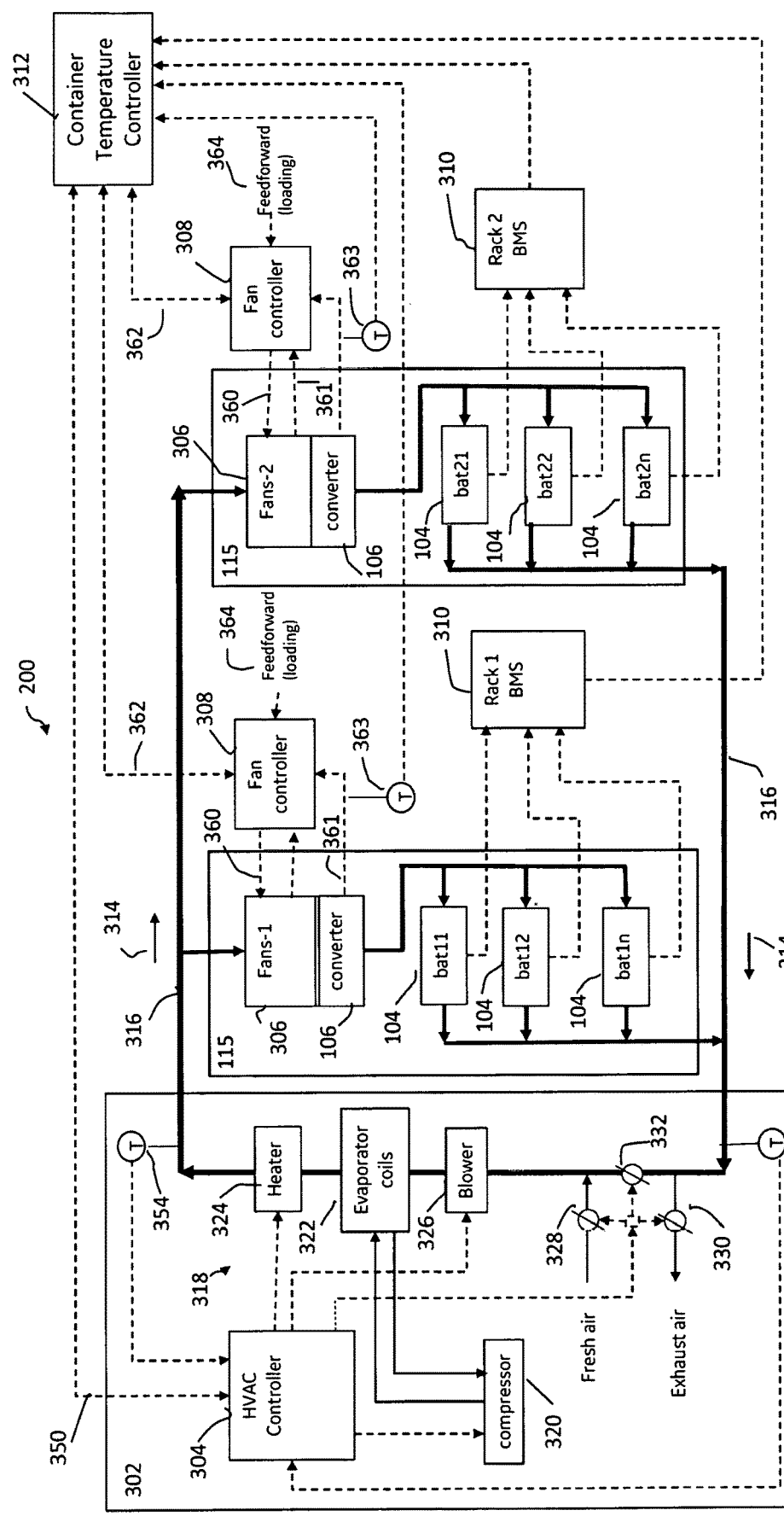
FIG. 6 is a block diagram of an energy storage system including a temperature control system in accordance with the present invention.

FIG. 6 illustrates a schematic block diagram of the temperature control system 200 within an embodiment of the container 102 of an energy storage system 100 similar to that shown in FIGS. 2 and 3. The temperature control system 300 controls the temperature and management of the circulation of the air flow 162 passing through the container 102 and battery module strings 115. The temperature control system 300 includes a HVAC system 302, HVAC controller or thermostat 304, a plurality of fans 306, a plurality of fan controllers 308, and a plurality of battery management strings (BMS) 310, and a container temperature controller 312. The HVAC controller 304 controls the temperature of the cooling fluid 314, for example air, and the volumetric flow rate of the air circulating though the ducts and/or conduits 316 of the container 102. The HVAC system 304 includes HVAC components 318, such a compressor 320, evaporator coils 322, heater 324 and blower 326, to cool and/or heat and to circulate the air 314 throughout the interior of the container 102. The HVAC system 302 also includes an inlet valve 328 to provide fresh air to the duct or flow path 316, and an outlet valve 330 to remove exhaust air from the duct or flow path. A throttling valve 332 may be disposed within the circulating flow path 316 between the inlet valve 328 and outlet valve 330 to balance the addition of fresh air and the removal of exhaust air from the flow path simultaneously. In another embodiment, the inlet valve 332, throttling valve 332 and outlet valve 330 may be regulated in a coordinated way for air flow balancing purpose.

The HVAC controller or thermostat 304 programed to execute steps to determine the operating parameters to operate the heater 324, compressor 320, blower 326, and various valves, such as the inlet valve 328, outlet valve 330 and shutoff valve 332, and to provide a corresponding operating command to each of these HVAC components 318, in response to an HVAC temperature setpoint provided at input 350 by the container temperature controller 312, and the temperature of the return air and/or the temperature of the supply air by respective temperature sensors 354. The feed forward loading signal may be predefined charge/discharge profile for individual battery strings.

The plurality of fans 306 of each battery module string 115 within the container 102 are controlled by the respective fan controller 308. The fan controller 308 is programmed to execute steps of determining the fan speed and providing an operating command 360 to each of the fans 306 to control the fan speed in response to one or more of the speed 361 of the respective fan provided by a tachometer, the temperature of the power converter provided by one or more temperature sensors 363, and the converter temperature setpoint 362 provided by the container temperature controller 302. In another embodiment, a feed forward loading signal 364 is provided to the fan controller to control the fan speed.

As further shown in FIG. 6, each battery storage module 115 includes a battery management system (BMS) 310 which receives signals indicative of the condition of the batteries or energy storage modules 120, including the temperature, current and voltage of each battery. Based on these temperature measurements, each battery management system 310 provides signals to the container temperature controller 312 including at least one of the median temperature, mean temperature, maximum temperature, and minimum temperature of the batteries 120 of each respect battery module string 104, as best shown in FIG. 1.

The container temperature controller 312 is a supervisory controller to control the HVAC controller 304 and fan controllers 306. The container temperature controller 312 is programmed to execute steps to determine the HVAC temperature setpoint at 350 and the temperature setpoint at 362 for each fan controller 308, which is correspondingly provided to the HVAC controller 304 and fan controllers 308. The HVAC temperature setpoint 350 and temperature setpoint 362 are based in part on the temperatures provided by the HVAC system 302, fan controllers 308 and battery management systems 310.

Figure 7A:
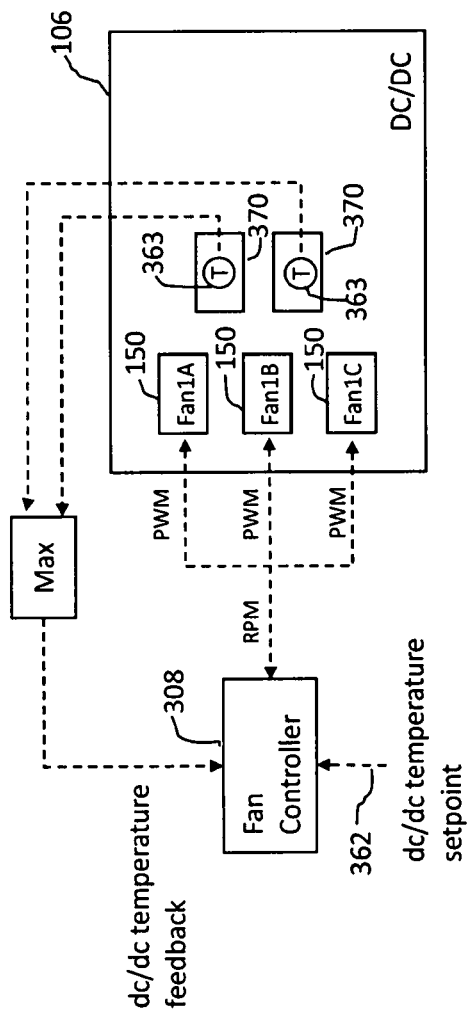
FIGS. 7a and 7b are block and schematic views of sensor arrangements for a temperature control system in accordance with the present invention.
Figure 7B:
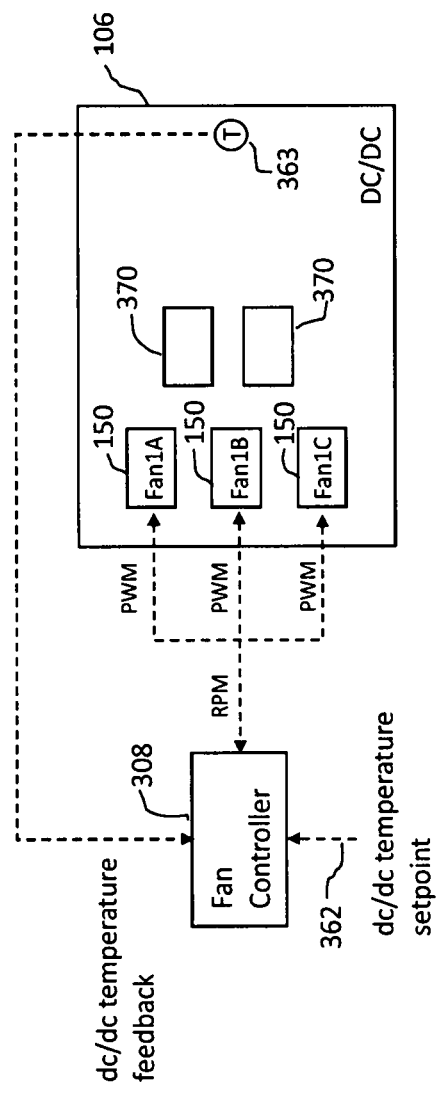

FIGS. 7a and 7b includes block and schematic views of alternative sensor arrangements for the dc/dc power converters 106 in accordance with embodiments disclosed herein. In the embodiment of FIG. 7a, the dc/dc power converters 106 (also shown in FIG. 1 as power converters) electrically couple respective battery strings 104 to the DC bus 102 (shown in FIG. 1), the temperature sensors 363 are positioned for sensing temperatures at the respective dc/dc power converters 106, and the fans 150 are positioned for directing air through respective dc/dc power converters. In the specific example of FIGS. 7a and 7b, there are three fans 150 for each dc/dc power converter 106 for illustrative purposes only. As shown in FIG. 7a, a plurality of temperature sensors 363 may be positioned proximate to switches 370 of the power converters 106, wherein the maximum temperature is provided to the fan controller 308. Alternatively, as shown in FIG. 7b, a temperature sensor 363 may be positioned proximate at the air outlet of the dc/dc power converter 106. In one embodiment, the switches 370 comprise silicon carbide (SiC) devices, for example. FIGS. 7a and 7b further illustrate the fan controller 308 providing a pulse width modulation signal provided to each of the fans 150 to control their speed. The fan controller 308 also receives signals indicative of the fan speed (in rotations/minute (rpm)) by a tachometer (not shown) of each fan.

Figure 8:
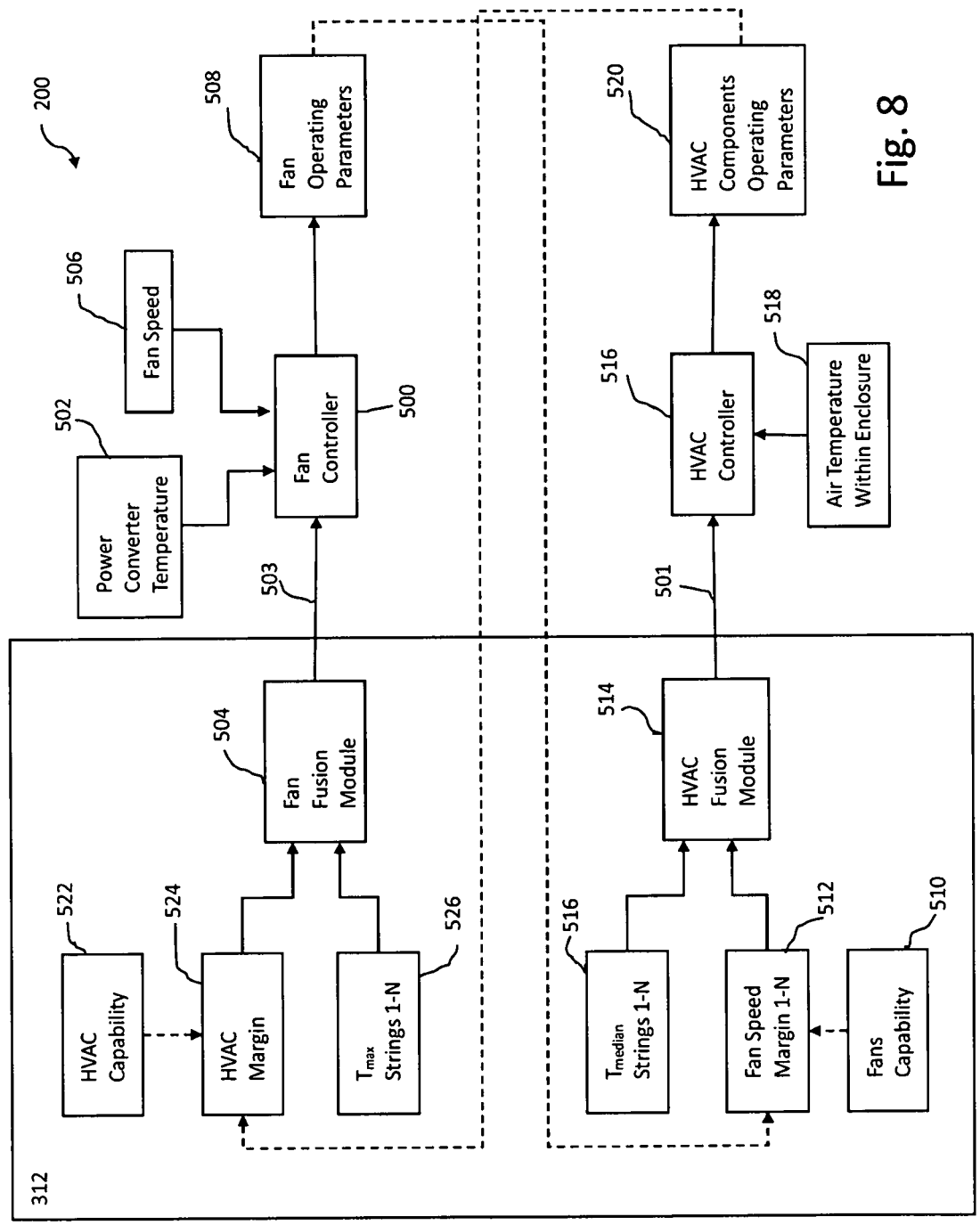
FIG. 8 is a block diagram of a temperature control system for coordinating local fan and HVAC operation in accordance with the present invention.

FIG. 8 illustrates a functional block diagram of the temperature control system 200 of FIG. 6 for coordinating the local fans 150 and the HVAC system 302 operation in consideration of the operating margins of the HVAC system and fans in accordance with an embodiment disclosed herein. As discussed above, the container temperature controller 312 is programmed to determine HVAC temperature setpoints 501 and temperature setpoints 503 provided to the HVAC controller 312 and the fan controller(s) 500, respectively. In the embodiment of FIG. 8, each of the fan controllers at block 500 provides a fan operating command to control the speed of respective fans based the temperature of each respective power converter 106 at block 502 and the temperature converter temperature setpoint provided by a fan fusion module at block 504 of the container temperature controller. The speed of the fans 150 are regulated in response to a fan speed signal provided by the respective fan speed tachometer at block 506. In one embodiment, the fan speed controller minimizes an error between the fan speed operating command and the feedback from the tachometer by regulating a voltage applied to the fan using pulse width modulation (PWM) as shown in FIGS. 7a and 7b. One example of a more specific fan speed operating command generation embodiment is discussed below with respect to FIG. 9.

With continued reference to FIG. 8, each fan 150 has an operating capability or limits represented by block 510. The fan speed margin at block 512 represents the difference between that fan operating capability and the current operating parameter of a respective fan (1-N) at block 508, including for example the operating command for and/or speed of the respective fan. An HVAC fusion module of block 514 uses a plurality of the fan speed margins and temperature statistic value of the battery strings at block 516 to provide the HVAC temperature setpoint to the HVAC controller at block 516. The temperature statistics may be median, mean, maximum and minimum value of the battery string temperature.

In turn the HVAC controller at block 516 provides a plurality of operating commands to control each of the HVAC components as best shown in FIG. 6 based on the HVAC temperature setpoint provided by the HVAC fusion module at block 514 of the container temperature controller 312 and the air temperature within the enclosure 102 provided by one or more temperature sensors disposed at select locations within the enclosure at block 518. For example, the temperature of the return air and/or supply air provided by the temperature sensors 354 of FIG. 6 may provide the air temperature feedback at block 516 to the HVAC controller 304 at block 516. Each of the HVAC components 520 has an operating HVAC capability or limits represented by block 522. The HVAC margin at block 524 represents the difference between that HVAC operating capability and the current operating parameters of the HVAC components at block 520, including for example the respective operating commands 312 of the respective HVAC components. The HVAC fusion module of block 504 uses the respective HVAC margins and maximum temperatures of the battery strings at block 526 to provide the fan temperature setpoint to the fan controller at block 500. One example of a specific HVAC operating command generation embodiment is discussed below with respect to FIG. 10. Examples of potential HVAC component commands include temperature setpoint, blower speed, compressor speed, and/or heater load. In one example, the fan fusion module determines whether the HVAC margin is sufficiently wide and, if so, sends an instruction to the fan speed controller to primarily balance the string temperature difference or, if not, sends an instruction to the fan speed controller to further increase or decrease the average temperature in the vicinity of the fan. As shown, the two operating margins of the HVAC system 312 and the fans 150 are interlock or dependent on each other for workload sharing to improve availability. In other words, the container temperature controller considers the operating margins of both the fans 150 and HVAC system 312 when determining the operating command of each.

Figure 9:
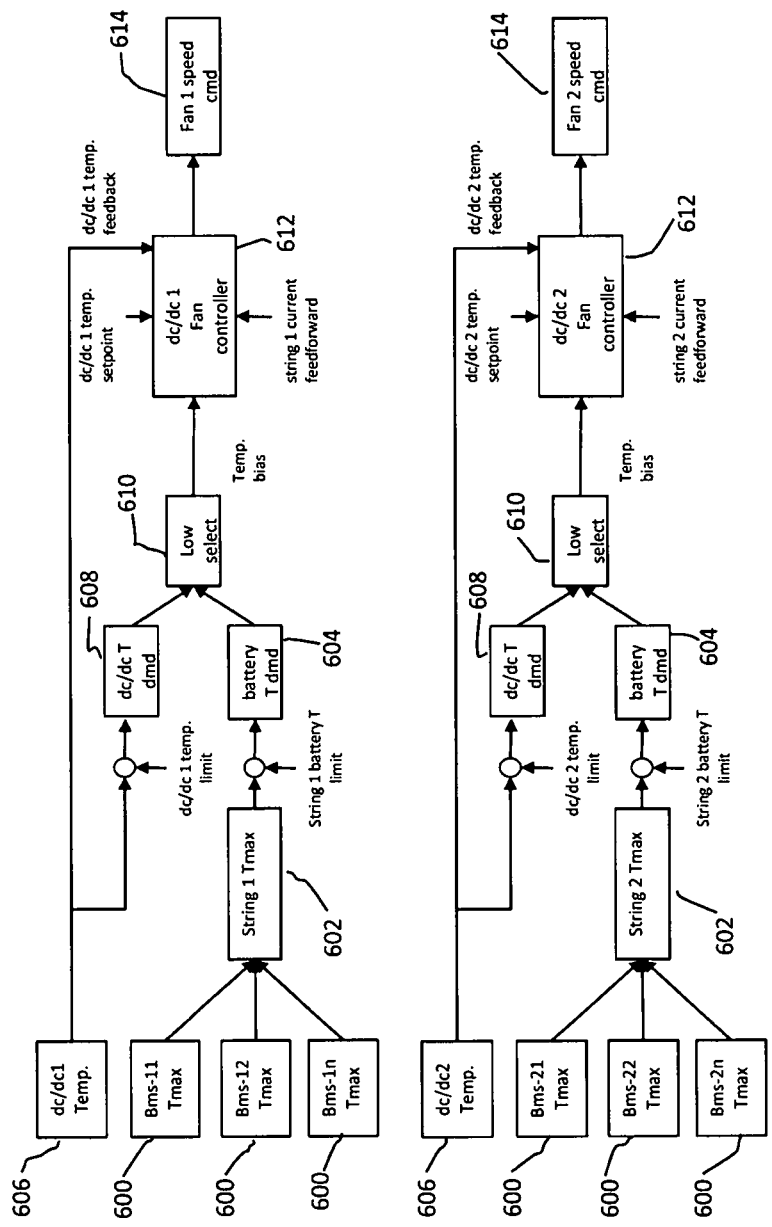
FIG. 9 is a block diagram of fan speed control portion of a temperature control system in accordance with the present invention.

FIG. 9 is a block diagram of a method of controlling the fan speed of the fans 150 of a first and second battery module string 115 of a temperature control system 200 of FIG. 6 in accordance with an embodiment disclosed herein. In the embodiment of FIG. 9, the temperatures from the sensors 363 in the vicinity of dc/dc power converters 106 (best shown in FIGS. 7a and 7b) and maximum temperatures (for example, Bms 11-1n and Bms 21-2n) of energy storage modules 120 in a respective battery string 104 are obtained at blocks 600. A maximum temperature for each battery string 104 at blocks 602 is identified and compared with a battery string temperature limit to generate a battery temperature demand (representing a battery temperature margin) at block 604. In parallel, the sensed temperature of the dc/dc power converter at block 606 associated with the respective battery string 104 is compared with a converter temperature limit to generate a converter temperature demand at block 608. The lower of the battery temperature demand and the converter temperature demand is provided as the temperature setpoint bias for a fan controller 612 which also receives the sensed temperature of the dc/dc power converter 106, a setpoint temperature of the dc/dc power converter, and information about the current in the battery string. The fan controller at block 612 then generates the fan speed command by minimizing the error between the biased temperature setpoint and the temperature feedback value at block 614. The control technique may include a proportional-integral-derivative (PID) algorithm, proportional-integral (PI) algorithm, or a proportional (P) algorithm, for example.

Figure 11:
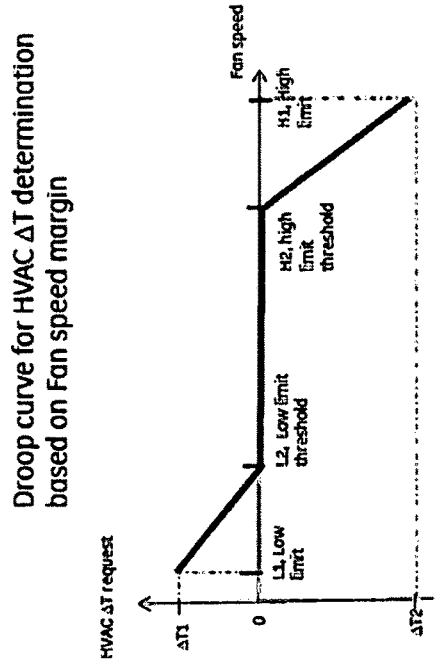
FIG. 11 is a droop curve of an HVAC component control portion of a temperature control system in accordance with the present invention.
Figure 10:
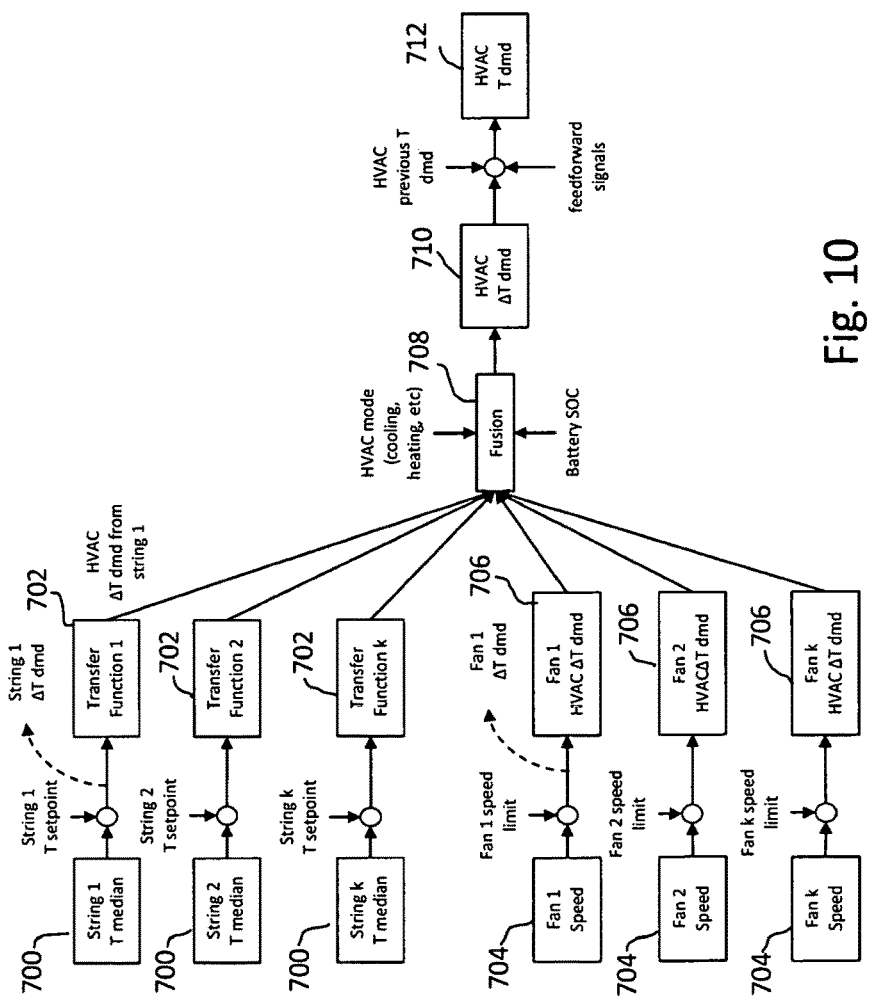
FIG. 10 is a block diagram of an HVAC component control portion of a temperature control system in accordance with the present invention.

FIGS. 10 and 11 is a block diagram of a method of controlling an HVAC component 318 of a temperature control system, as best shown in FIG. 6, and a droop curve for HVAC ΔT determination in accordance with an embodiment disclosed herein. In one example, the HVAC temperature setpoint is normally set in the range of 20 degrees Celsius to 25 degrees Celsius. The deviation from the battery temperature setpoint in each string is collected by comparing a median temperature of each battery string 104 at block 700 with a temperature setpoint of each battery string. Transfer functions at block 702 may be used to generate HVAC delta temperature demands for each battery string 104. The transfer function reflects a mapping relationship from the string temperature deviation to the HVAC delta temperature demands. This transfer function can be obtained by field test, historical data or any suitable modeling technique.

The battery temperature deviation then affects the control of the HVAC temperature increase or decrease. For example, if the HVAC system is in a cooling mode and the largest ΔT demand from all battery strings 104 is −5 degrees Celsius, then the HVAC ΔT dmd will be set as −5 degrees Celsius assuming the gain between the battery string ΔT to HVAC ΔT is 1. The statistics of battery string temperature deviation may be used to reflect the overall indoor air temperature gap to meet the battery temperature requirement.

In parallel to the battery string temperature measurements at block 700, the closeness of fan speed at block 704 to the maximum fan speed limit in each battery string is also collected as the fan speed margin at block 706. The fan speed margin reflects the capability for each fan to keep the battery string 104 and the dc/dc converter 106 away from the high temperature limit. A smaller fan speed margin means the corresponding battery string 104 has less capability to overcome the battery temperature variation in that battery string. Hence, the average battery temperature should be lower to reduce the risk of overheating or overcooling. The fan speed margins are used to generate respective HVAC ΔT dmds at blocks 708 and 710.

FIG. 11 shows a droop curve for HVAC ΔT determination based on fan speed margin with the X axis showing the fan speed and the Y axis showing the HVAC ΔT request by the fan speed margin. The intersection point between the X axis and the Y axis represents a HVAC ΔT request of zero. L1 and H1 represent respectively the low limit and high limit of the fan speed. L2 and H2 represent respectively the low limit threshold and high limit threshold. The HVAC ΔT request is zero when the fan speed is in between the low limit threshold L2 and high limit threshold H2. The HVAC ΔT request will go down if the fan speed goes beyond the high limit threshold H2. In this case, the fan speed controller will request the HVAC to decrease the temperature setpoint as the fan speed gets closer to its high limit H1. In the example of FIG. 11, the decreased ΔT request is linear with the distance from the fan speed to the fan speed high limit H1. In another embodiment, this relationship between the decreased ΔT request and the distance from the fan speed to the fan speed high limit H1 may be piecewise linear or nonlinear function The HVAC ΔT request will go up if the fan speed goes beyond the low limit threshold L2. In this case, the fan speed controller will request the HVAC to increase the temperature setpoint as the fan speed gets closer to its low limit L1. The increased ΔT request is linear with the distance from the fan speed to the fan speed low limit L1. In another embodiment, this relationship between the increased ΔT request and the distance from the fan speed to the fan speed low limit L1 may be piecewise linear or nonlinear function ΔT1 represents the maximal HVAC ΔT increase amount and ΔT2 represents the maximal HVAC ΔT decrease amount. The slope of the HVAC ΔT increase droop curve and slope of the HVAC ΔT decrease droop curve can be different. In the specific embodiment of FIG. 9, the slope of the HVAC ΔT decrease droop curve is sharper than the slope of the HVAC ΔT increase droop curve.

The fusion of the HVAC ΔT dmds at block 708 may additionally be based on the HVAC running mode (heating, cooling, venting, etc.) and battery status of charge (SOC) (for example, one embodiment may relax the temperature control if battery SOC<40%). The HVAC ΔT demand from a battery string 104 can be a low selection for cooling mode or a high selection during heating mode. In one specific embodiment, the fused HVAC ΔT demand can be determined based on pair analysis of string battery ΔT dmd and corresponding fan ΔT dmd. For example, the HVAC ΔT dmd may be a weight sum of string 1 ΔT dmd and fan 1 ΔT dmd if they are both the highest in the string group and fan group. The final HVAC temperature demand at block 712 is then determined based on the previous HVAC temperature demand and feedforward signals. The feedforward signal may comprise, for example, solar irradiation, ambient temperature, and/or battery charging or discharging profiles. In one embodiment, two HVAC units may be located in parallel at one end of the enclosure and both provide cooling/heating air for two groups of battery strings at one half and the other half of the enclosure. In this case, the feedforward signal may also comprise a temperature request from the other half of battery temperature control system. For example, when one HVAC reaches it full capacity or goes into a fault state, the other HVAC may be asked to provide more cooling air to extend the service time of the battery system 100.

In the embodiment of FIG. 6 for example, each of the container temperature controller 312, the HVAC controller 304, and the fan controllers 308 may include one or more processor(s) and associated memory device(s) configured to perform a variety of computer-implemented functions (e.g., performing the methods, steps, calculations, and the like disclosed herein). As used herein, the term "processor" refers not only to integrated circuits referred to in the art as being included in a computer, but also refers to a controller, a microcontroller, a microcomputer, a programmable logic controller (PLC), an application-specific integrated circuit, and/or other programmable circuits.

Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements. Such memory device(s) may generally be configured to store suitable computer-readable instructions that, when implemented by the processor(s), configure the controllers 312, 304, 308 to perform various functions.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

The invention claimed is:

1. An energy storage system comprising:
 a plurality of battery strings, each battery string including a plurality of batteries coupled electrically together;
 a plurality of temperature sensors;
 an enclosure housing the plurality of battery strings and the temperature sensors;
 a plurality of fans positioned in different locations within the enclosure; and
 a temperature control system comprising:
  heating, ventilation, and air conditioning (HVAC) components configured to convey air into said enclosure at an air temperature according to a temperature setpoint, and
  a controller programmed to execute the method comprising:
   determining fan speed operating commands based at least in part on sensed temperatures at the different locations,
   determine the temperature setpoint for said temperature control system based at least in part on sensed temperatures at different locations, and
   operating the respective fans in response to the fan speed operating commands provided to the respective fans.

2. The energy storage system of claim 1 further comprising a plurality of DC/DC power converters electrically coupling respective battery strings to a DC bus, wherein the temperature sensors are positioned for sensing temperatures at respective DC/DC power converters, and wherein the fans are positioned for directing air through respective DC/DC power converters.

3. The energy storage system of claim 1, wherein the controller is further programmed to obtain temperature data of the plurality of batteries, and wherein the determining the fan speed operating commands is further based at least in part on the temperature data of the batteries.

4. The energy storage system of claim 2, wherein the temperature sensors are positioned proximate to switches of the DC/DC converters or outlets of the DC/DC converters.

5. The energy storage system of claim 2 further comprising air ducting configured for directing the air from the fans through the plurality of battery strings after being directed through the plurality of DC/DC power converters.

6. The energy storage system of claim 1, wherein the controller is further programmed to determine HVAC component commands based at least in part on operating margins of the fans.

7. The energy storage system of claim 6, wherein the determining fan speed operating commands is further based at least in part on an operating margin of the HVAC components.

8. The energy storage system of claim 1, wherein determining fan speed operating commands is further based at least in part on currents of the battery strings.

9. The energy storage system of claim 8, wherein the determining fan speed operating commands is further based at least in part on battery temperature margins.

10. The energy storage system of claim 1, wherein the battery strings comprise vertically stacked battery sub modules and the fans are situated above respective ones of the battery strings.

11. The energy storage system of claim 1 wherein the battery strings comprise horizontally stacked battery sub modules and the fans are situated on one or more sides of respective ones of the battery strings.

12. The energy storage system of claim 1, wherein the plurality of fans include individual fans or groups of fans are situated relative to multiple respective battery strings and direct air through the air ducting across the multiple battery strings.

* * * * *